United States Patent [19]
Morito

[11] Patent Number: 5,852,442
[45] Date of Patent: Dec. 22, 1998

[54] METHOD OF DRAWING A THREE-DIMENSIONAL OBJECT

[75] Inventor: Masao Morito, Kawasaki, Japan

[73] Assignee: Fujitsu Limited, Kawasaki, Japan

[21] Appl. No.: 674,513

[22] Filed: Jul. 2, 1996

[30] Foreign Application Priority Data

Jan. 12, 1996 [JP] Japan ..................................... 8-003496

[51] Int. Cl.⁶ .................................................. G06K 17/40
[52] U.S. Cl. ............................................................ 345/419
[58] Field of Search ........................ 345/427; 364/474.22

[56] References Cited

U.S. PATENT DOCUMENTS

| | | | |
|---|---|---|---|
| 4,685,070 | 8/1987 | Flinchbaugh | 345/424 |
| 4,933,865 | 6/1990 | Yamamoto et al. | 382/203 |
| 5,299,307 | 3/1994 | Young | 345/339 |
| 5,303,337 | 4/1994 | Ishida | 395/119 |
| 5,412,762 | 5/1995 | Kondo | 345/420 |
| 5,528,735 | 6/1996 | Strasnick et al. | 345/427 |
| 5,577,176 | 11/1996 | Friedman et al. | 345/427 |
| 5,701,403 | 12/1997 | Watanabe et al. | 395/119 |

FOREIGN PATENT DOCUMENTS 0 241 071  10/1987  European Pat. Off. .

OTHER PUBLICATIONS

"Stereo CAD–3D Solid Modeling System" Software [Atari ST], Issue 8, Dec., 1992, p. 23.

*Primary Examiner*—Anton Fetting
*Assistant Examiner*—Alford W. Kindred
*Attorney, Agent, or Firm*—Staas & Halsey

[57] ABSTRACT

A method of drawing a three-dimensional object in a CAD system, which allows the operator to use two-dimensional drawing techniques. The CAD display screen has three view windows for showing a top, front, and side views. The operator draws a figure in one of the view windows and then defines a first geometry point in the next view window by using a cross-hair cursor running across the two adjacent view windows. The use of the cursor gives some constraint to the selection of the first geometry point with respect to the first graphic element. Next, the operator defines a second geometry point also using the cross-hair cursor for constraint, thus creating a second graphic element from the first and second geometry points. Based on the first and second graphic element, a third graphic element is automatically generated and displayed in still another view window.

14 Claims, 14 Drawing Sheets

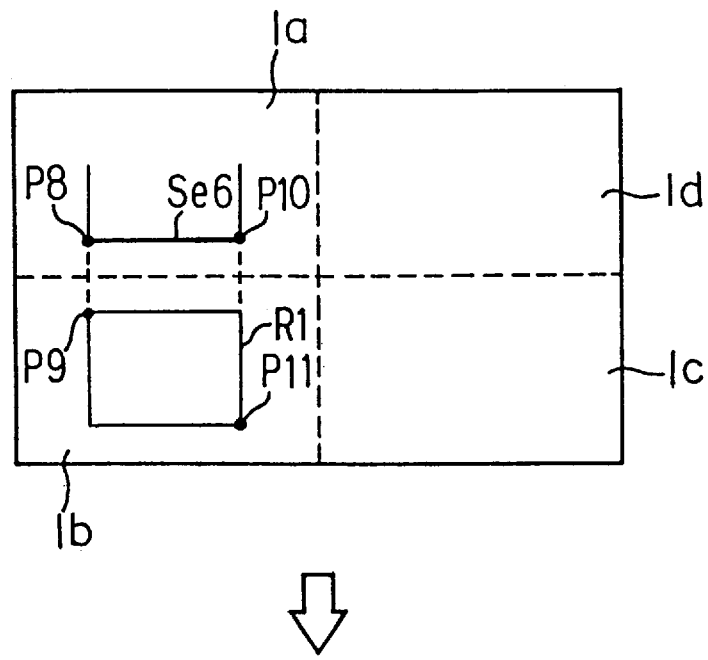
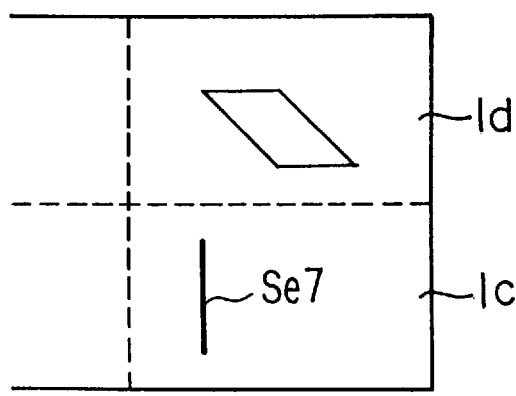
FIG. 8

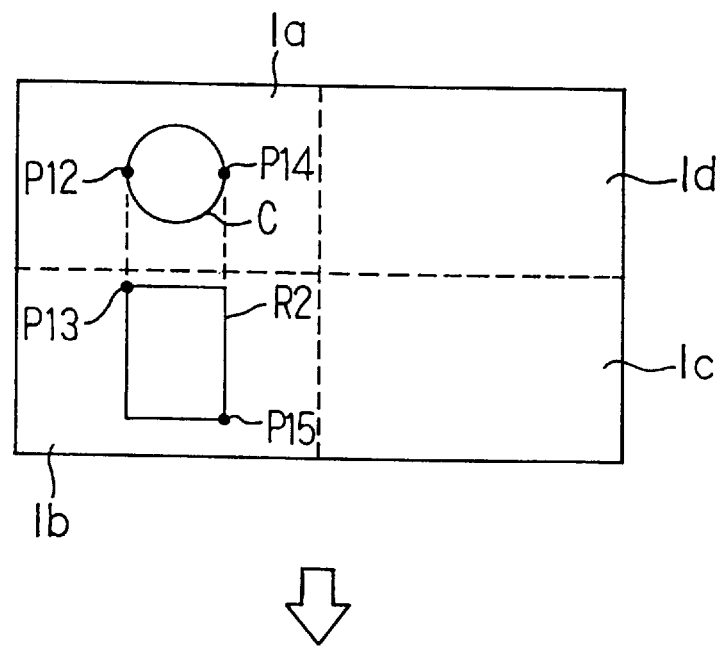
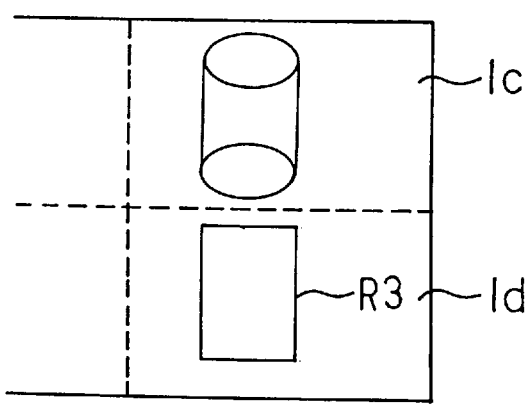
FIG. 9

| | |
|---|---|
| ELEMENT ID | |
| ELEMENT TYPE = LINE SEGMENT | LENGTH |
| X-COORDINATE OF START POINT | Y-COORDINATE OF START POINT |
| X-COMPONENT OF POINTING VECTOR | Y-COMPONENT OF POINTING VECTOR |
| OTHER ATTRIBUTES | |

} 4a

| | |
|---|---|
| ELEMENT ID | |
| ELEMENT TYPE = CIRCLE | RADIUS |
| X-COORDINATE OF CENTER | Y-COORDINATE OF CENTER |
| OTHER ATTRIBUTES | |

} 4b

| | |
|---|---|
| ELEMENT ID | |
| ELEMENT TYPE = ARC | RADIUS |
| X-COORDINATE OF CENTER | Y-COORDINATE OF CENTER |
| START ANGLE | END ANGLE |
| OTHER ATTRIBUTES | |

METHOD OF DRAWING A THREE-DIMENSIONAL OBJECT

BACKGROUND OF THE INVENTION

1. Field of the Invention

The present invention relates to a method of drawing a three-dimensional object. More specifically, the present invention relates to a method of three-dimensional modeling, or creating three-dimensional design data, for a computer-aided design (CAD) system running on a computer platform where only two-dimensional input devices such as a mouse and keyboard are available for entering geometry data.

2. Description of the Related Art

It is a hard task in general to enter three-dimensional objects using two-dimensional input devices, and thus operators are required to be well-experienced and sufficiently skillful. Also since conventional CAD systems have various different human interfaces, almost no one can achieve three-dimensional data input without training for this high expertise task. Therefore, in three-dimensional CAD systems of today, it is demanded to provide a straight-forward user interface which helps design engineers to input three-dimensional geometry data.

The most primitive method of three-dimensional modeling is to enter coordinate values directly through a keyboard and interconnect the entered geometric points with straight lines. According to another technique called "sweeping" or "swinging," the operator first creates a contour line by ordinary two-dimensional operations and then moves or rotates the contour line in a predetermined direction, thereby generating a three-dimensional object having a continuous surface formed as a trace of the contour line. Some techniques called "constructive solid geometry" (CSG) or "form feature modeling" produce a three-dimensional object by combining some fundamental solid objects, or primitives, which have predefined structure as relatively simple as a rectangular solid and cylinder. None of the above techniques, however, can provide perfect rendering of three-dimensional objects having complicated structural elements such as arbitrarily-curved surfaces.

There is another technique for three-dimensional modeling, which uses a three-view drawing as a source of geometry information. The operator picks up every coordinate from a three-view drawing, which has been previously drafted, by specifying associated points on the respective views to the CAD system. Based on the obtained coordinates, the system automatically generates a three-dimensional object.

Most design engineers have enough knowledge about two-dimensional drafting and are well trained for it. Three-dimensional design, however, asks them to learn additional techniques as described above and thus forces them to spend much time and labor.

SUMMARY OF THE INVENTION

Taking the above into consideration, an object of the present invention is to provide a comprehensive method of drawing a three-dimensional object, where the operator, being assisted by the CAD system, can use simple three-dimensional operations analogous to his/her familiar two-dimensional design techniques.

To accomplish the above object, there is provided a method of drawing a three-dimensional object in a CAD system having a three-view display screen. On the display screen, three view windows are placed in an L-shaped arrangement and respectively assigned to a top view, a front view, and a side view. The method comprises the following steps:

(a) drawing a figure containing a first graphic element on a first view window;

(b) defining a first geometry point in a second view window adjacent to the first view window by using a cross-hair cursor running across the first and second view windows so that the first geometry point will have a geometrical relationship with the first graphic element drawn in the first view window;

(c) defining a second geometry point in the second view window by using the cross-hair cursor so that the second geometry point will have a geometrical relationship with the first graphic element, and further defining a second graphic element with the first and second geometry points so as to give a depth to the figure drawn in the first view window; and (d) generating a third graphic element derived from the first and second graphic elements and displaying the third graphic element in the third view window.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a diagram showing a typical display screen when drawing a rectangle;

FIG. 9 is a diagram showing a typical display screen when drawing a rectangle associated with an existing circle;

FIG. 11 is a diagram showing typical data structure of graphic elements;

DESCRIPTION OF THE PREFERRED EMBODIMENTS

Figure 1:
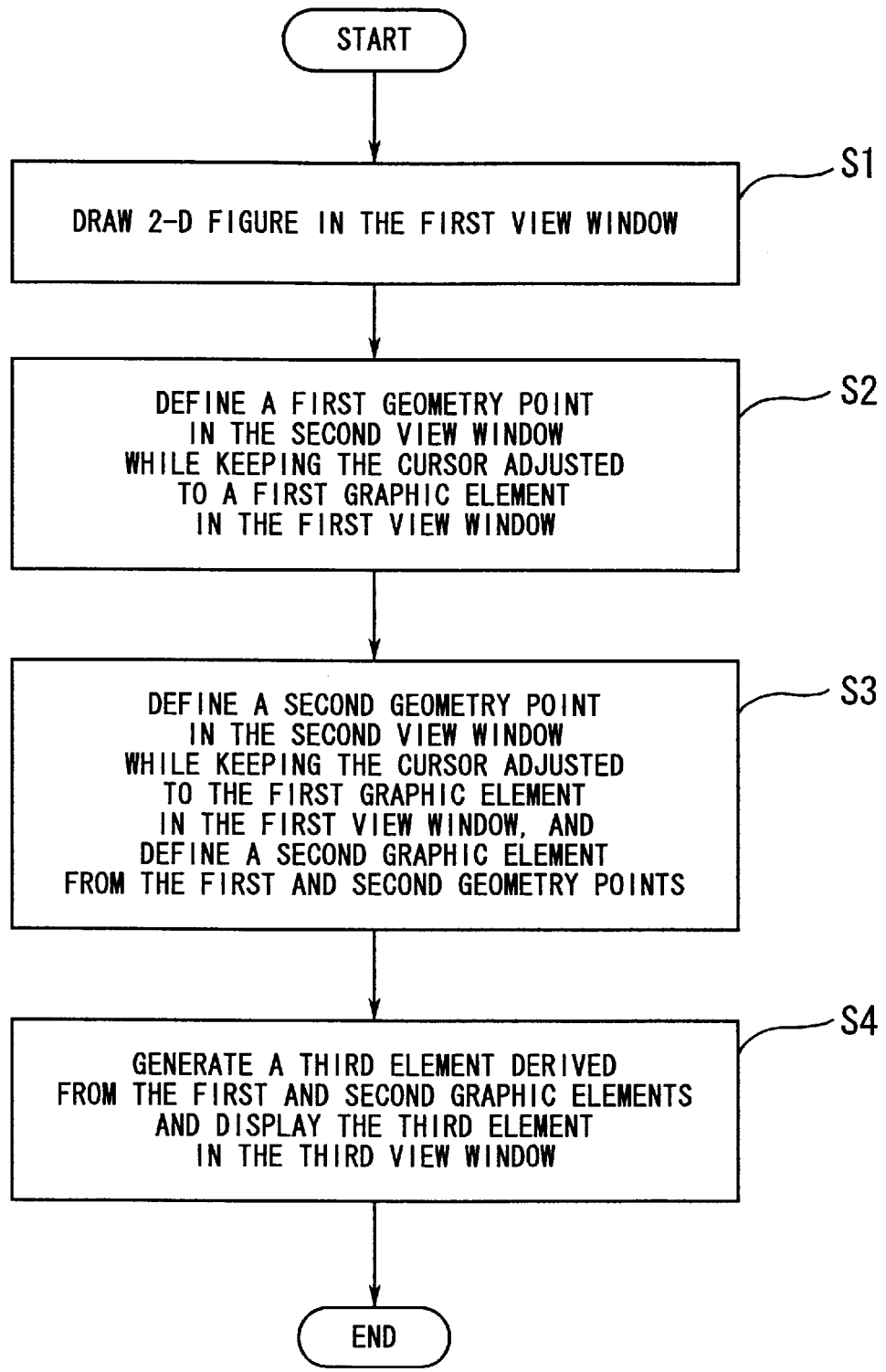
FIG. 1 is a flowchart showing the basic principle of three-dimensional modeling method according to the present invention.

At the outset, the present invention will be outlined with reference to FIG. 1, which provides the basic principle in flowchart form.

A CAD system incorporating a three-dimensional modeling method of the present invention has a three-view display screen, on which three view windows are open in an L-shaped arrangement and respectively assigned to the three projection views (i.e., a top view, a front view, and a side view). A three-dimensional object will be obtained by drafting a three-view drawing in those windows.

According to the present invention, the process of three-dimensional object modeling consists of the following four steps:

[S1] The process starts with drawing a figure in a first view window by using ordinary two-dimensional drafting techniques. The figure can be any one of the three views.

[S2] A first geometry point is defined in a second view window, which is adjacent to the first view window, by using a cross-hair cursor running across the two adjacent view windows. With an appropriate use of the cross-hair cursor, the first geometry point will have a particular geometrical relationship with a first graphic element contained in the figure drawn in the first view window.

[S3] A second geometry point is defined in the second view window by using the cross-hair cursor so that the second geometry point will have a particular relationship with the first graphic element in the first view window. The first and second geometry points now define a second graphic element that gives a thickness to the figure in the first view window.

[S4] A third graphic element is generated from the first and second graphic elements and displayed in the third view window.

In the above-described outline of the present invention, a certain figure is first created in either one of the top, front, and side view windows by using common two-dimensional drafting techniques. Derived from this first-created figure, another figure is produced in the next view window, and then still another figure is generated in the remaining view window.

The following description will now explain about a CAD system application as an embodiment of the present invention.

Figure 2:
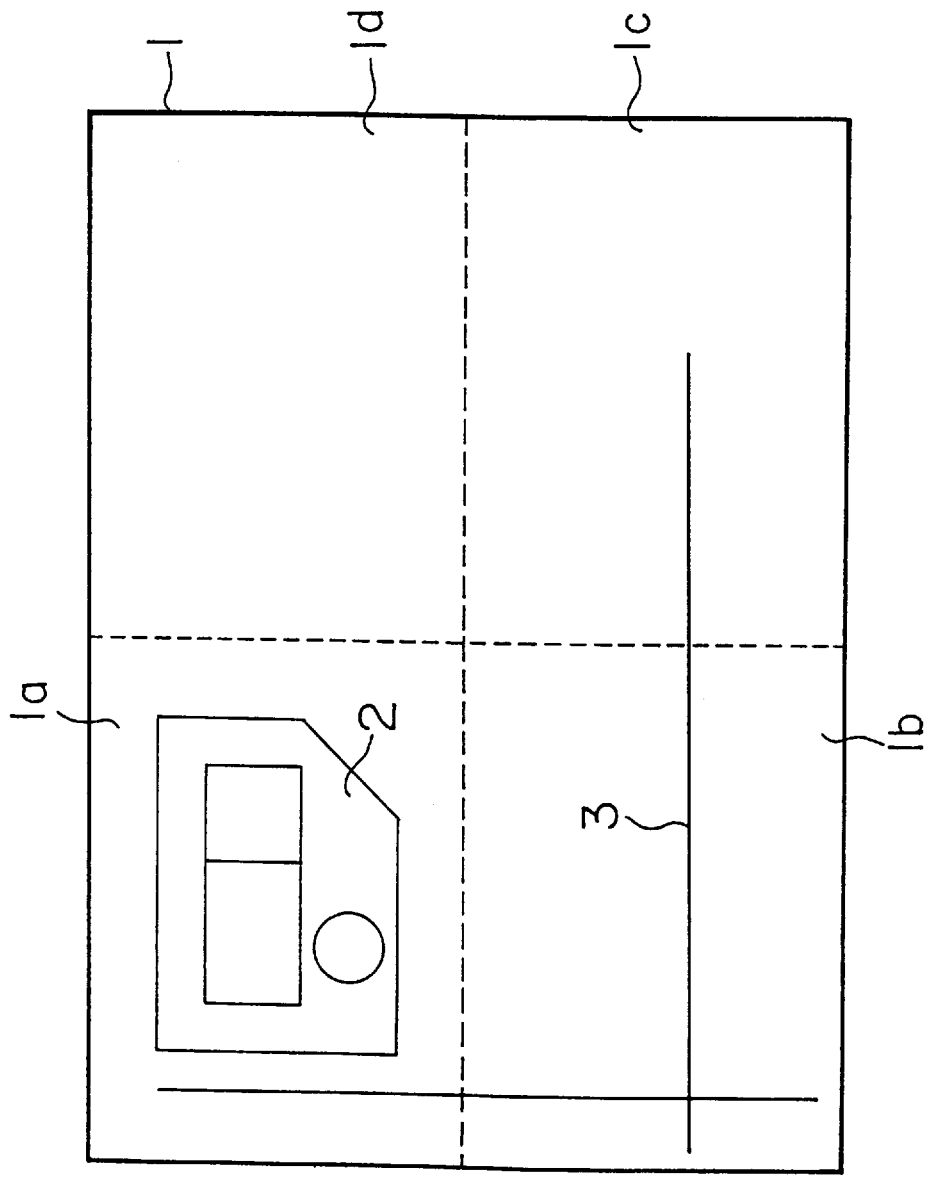
FIG. 2 is a diagram showing a typical display screen in the first step of the three-dimensional modeling method.

FIG. 2 shows a typical display screen in the first step of the three-dimensional modeling method.

This snapshot of the CAD display screen shows a large display area 1 consisting of four subdivided regions: top-view window 1a, front-view window 1b, side-view window 1c, and perspective-view window 1d for a three-dimensional object. A top-view FIG. 2 has been created already in the top-view window 1a with well-known two-dimensional drafting techniques. That is, the present screen shows a result of the above-described first step (S1). A cross-hair cursor 3 can be also seen on the screen, which consists of two cursor lines running across two adjacent view windows in the horizontal and vertical directions. The intersection point of this cross-hair cursor 3 follows the mouse movement, and the two cursor lines also move along with it, keeping their orthogonal postures on the screen.

Figure 3:
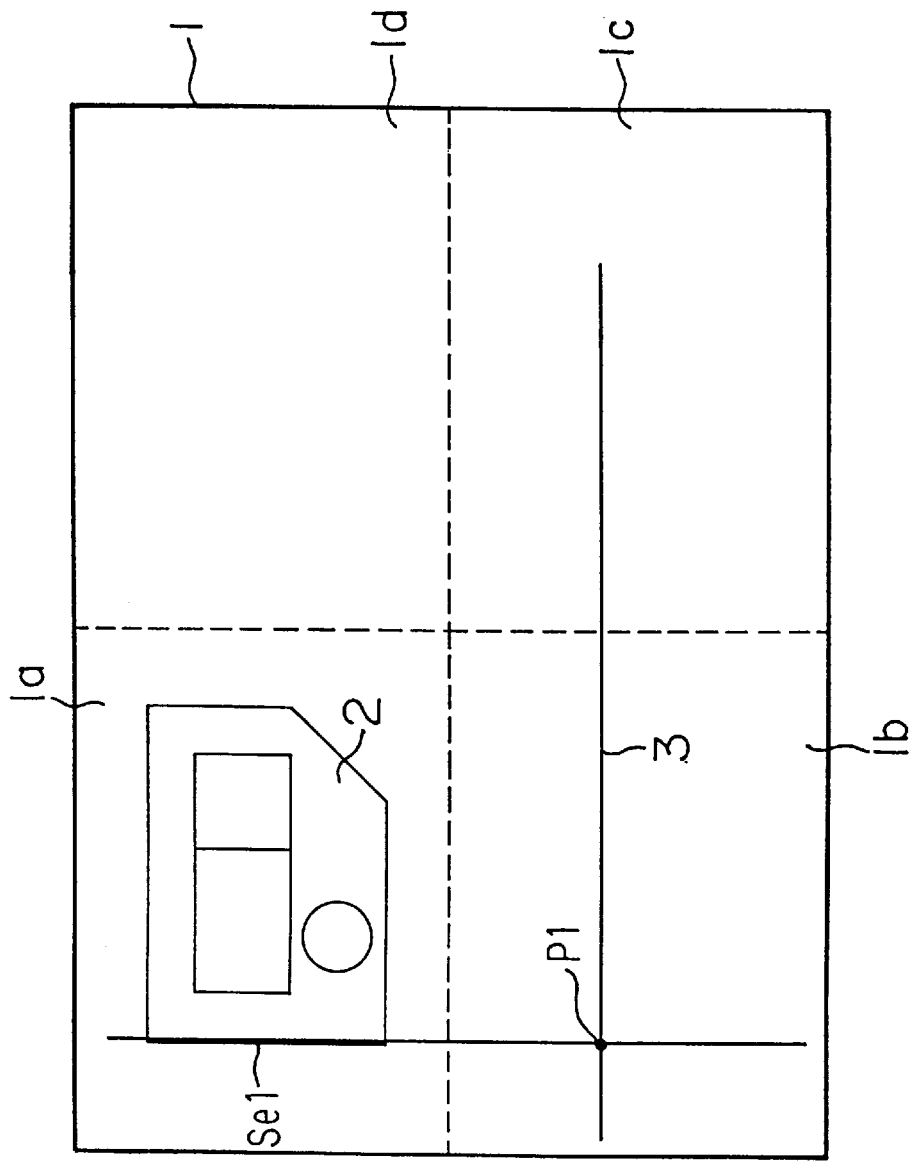
FIG. 3 is a diagram showing a typical display screen in the second step of the three-dimensional modeling method.

FIG. 3 shows a typical display screen in the second step of the three-dimensional modeling method.

In the second step (S2), a line segment Se1 on the left part of the top-view FIG. 2 in the top-view window 1a is projected to another view plane, say, to the front-view window 1b. Keeping the vertical cursor line adjusted onto the line segment Se1, the operator moves the intersection point of the cross-hair cursor 3 to an appropriate position and then issues a command to define a first geometry point P1. Note again that the operator is now constructing a solid object whose top view is given by the FIG. 2. Through the second step operation in this instance, the operator gave the CAD system an implication of definition of an upper-left or lower-left edge of the solid object.

Figure 4:
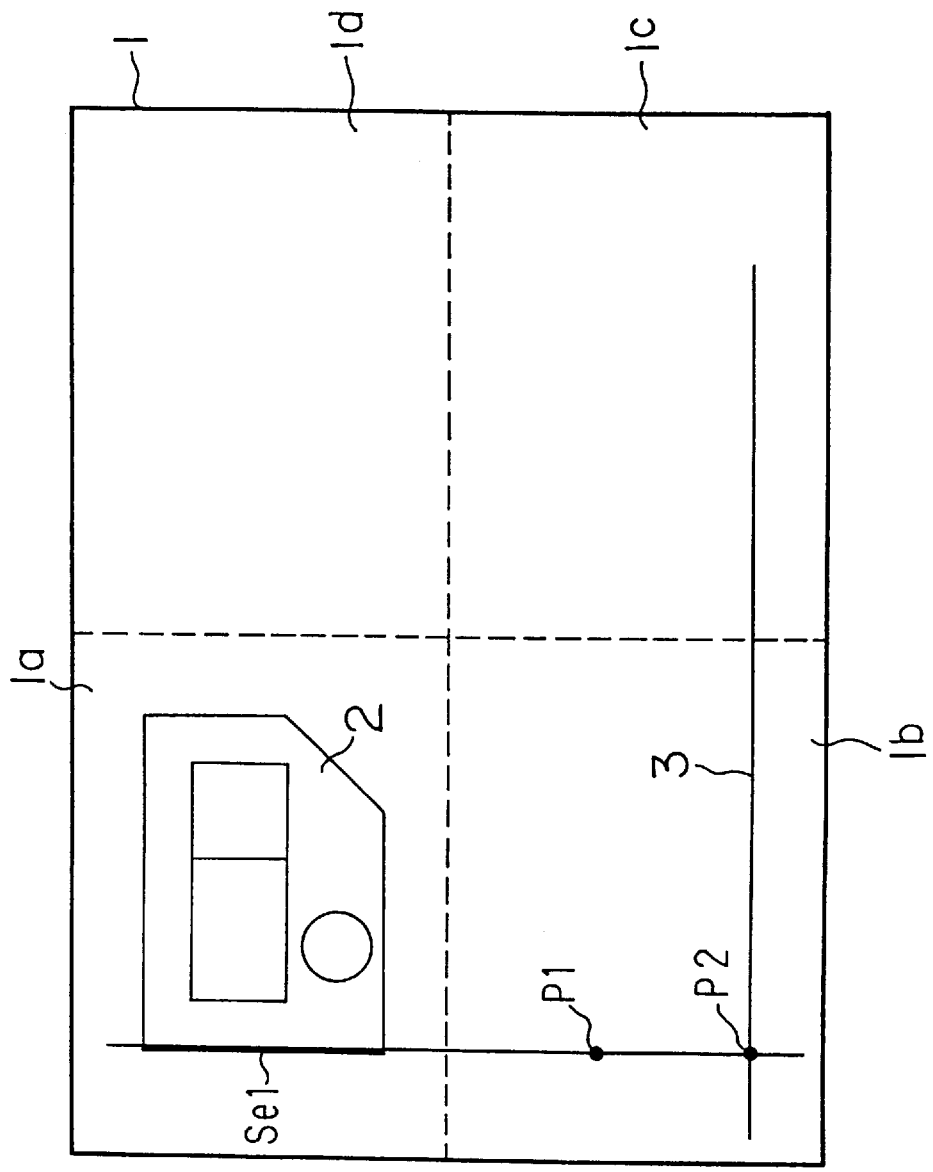
FIG. 4 is a diagram showing a typical display screen in the third step of the three-dimensional modeling method.

FIG. 4 shows a typical display screen in the third step of the three-dimensional modeling method.

In the third step (S3), the operator slides the cross-hair cursor 3 just vertically toward the next desired point P2, while keeping the vertical cursor line adjusted to the point P1. The operator then issues a command to define a second geometry point at the point P2. In the instance shown in FIG. 4, the point P2 is located below the point p1 in the front-view window 1b. This means that the first and second geometry points indicate the upper-left and lower-left edges of the solid object, respectively. That is, the operations to place the two geometry points in the second and third steps (S2 and S3) have resulted in a definition of thickness (or height) of the solid object in process.

Incidentally, there are two methods to define a line segment. One is to designate two positions for both ends of the line segment, and the other is to designate the coordinates of one end and then give the length and direction of the line segment. The former method was taken in the above example and it will be also used in the rest of this description.

Figure 5:
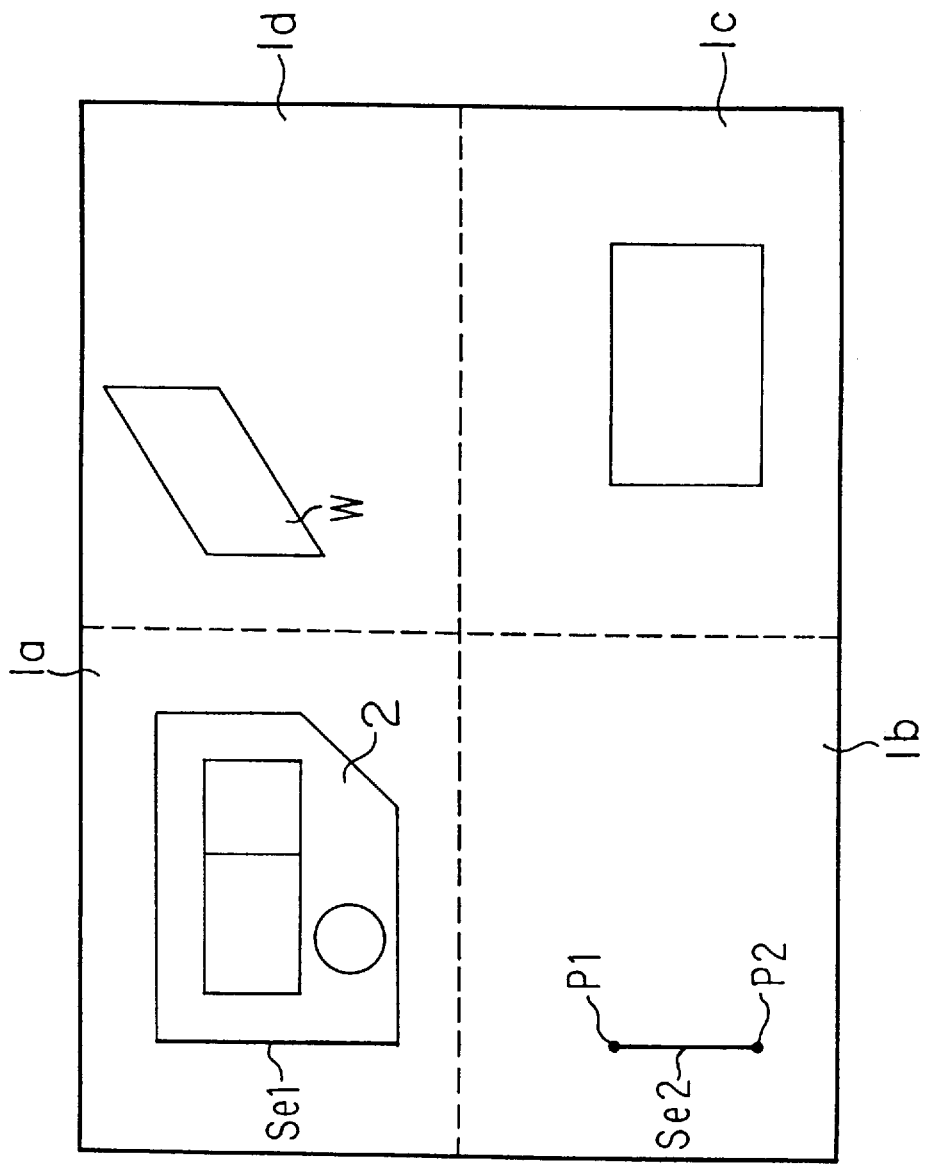
FIG. 5 is a diagram showing a typical display screen in the fourth step of the three-dimensional modeling method.

FIG. 5 shows a typical display screen in the fourth step of the three-dimensional modeling method.

As a result of the past two steps for designating the points P1 and P2, a line segment Se2 that connects those two points appears in the front-view window 1b. In the fourth step (S4), a three-dimensional model W is generated and its wire-frame representation appears in the perspective-view window 1d. The geometry of this three-dimensional model W derives from the coordinates of the line segments Se1 and Se2. Further, a rectangle is displayed in the side-view window 1c as a result of projection of the three-dimensional model W onto the side view plane. The lengths of two sides of this rectangle are equal to those of the line segments Se1 and Se2. The rectangle is positioned in the side-view window 1c so that its upper and bottom sides will be leveled with the points P1 and P2, respectively.

Figure 6:
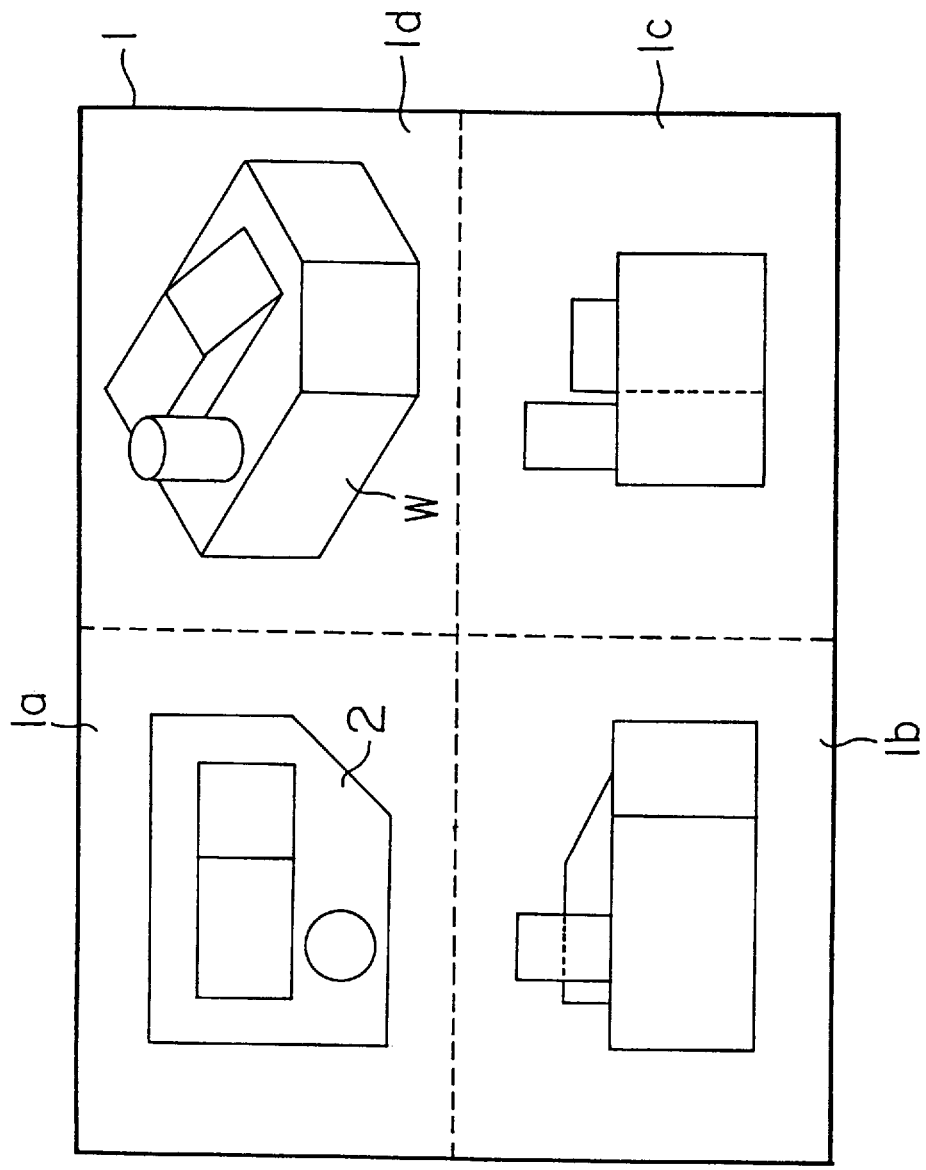
FIG. 6 is a diagram showing a typical display screen which presents a three-dimensional object that has been finally obtained.

FIG. 6 shows a typical display screen for the three-dimensional solid object that has been finally obtained.

After repetitively applying the above-described steps S2–S4 to the remaining graphic elements of the FIG. 2 in the top-view window 1a, the operator finally obtains a screen as shown in FIG. 6. The three-dimensional wire-frame model W with hidden-line elimination is completed in the perspective-view window 1d, and the side view is generated in the side-view window 1c as well.

Although in the above explanation the operator first finished the top view and then created the front view using the complete top view as reference, the present invention is not restricted to such drawing order. Rather, the present invention permits the operator to start with the front view or side view instead of the top view, and it is even allowed to change this initial view selection in the middle of drawing process. For instance, the operator may draw a line segment or other graphic elements in the front-view window and create the top view with reference to the elements in the front-view window. Then the operator can move to the side-view window to add more graphic elements and then go back to the front view to update it with respect to the new elements drawn in the side-view window. As such, the operator can draw the three views step by step by repeating the full range of steps S1–S4 at his/her choice.

In the process of three-view creation, when defining a new line segment in a certain window with reference to an existing graphic element in another window, the operator uses the cross-hair cursor to indicate to the system which existing element should be selected and what kind of geometrical data should be recognized. In reality, there are several patterns of such indication. The above description only demonstrated a specific case where the graphic element of interest and one of the cursor lines were oriented in the same direction. More specifically, the line segment Se1, which is drawn as part of the FIG. 2 in the top-view window 1a, lies in the same direction as the vertical cursor line of the cross-hair cursor 3. The operator can fit and keep the vertical cursor line onto the whole line segment Se1 and define the points P1 and P2 to create the line segment Se2. The line segment Se1 in the top-view window 1a implies two horizontal edges of the solid object, while the line segment Se2 in the front-view window 1b suggests two vertical edges thereof. Therefore, a rectangular frame W is created in the perspective-view window 1d, as part of the three-dimensional wire-frame model of the solid object. Likewise, a rectangle surface derived from the line segments Se1 and Se2 is projected in the side-view window 1c. The CAD system calculates the three-dimensional coordinates of the left side surface according to the two-dimensional coordinates captured from the top and front views. The left side surface is then mapped onto the projection planes for the side and perspective views and the obtained projection views are drawn in their respective windows on the display screen.

The following description will now present other cases in which the graphic element of interest and the vertical cursor line are oriented in different directions.

Figure 7:
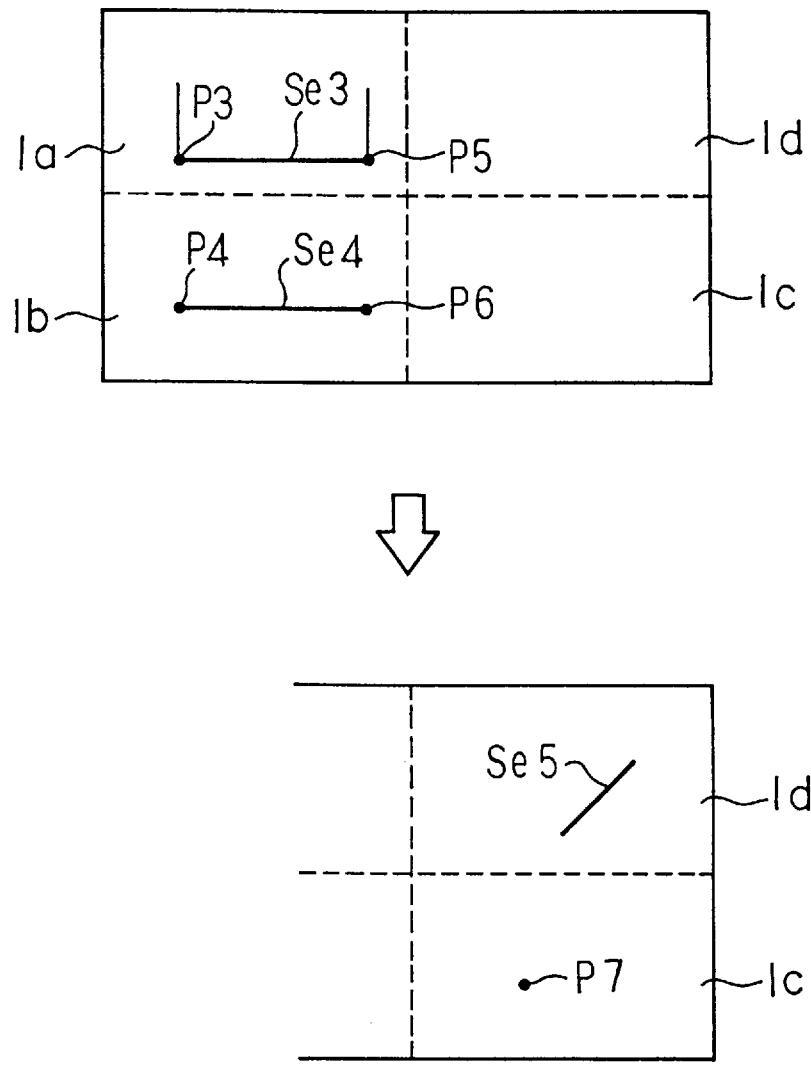
FIG. 7 is a diagram showing a typical display screen when drawing a horizontal line segment.

FIG. 7 shows a typical display screen when drawing a horizontal line segment. The upper part of FIG. 7 represents the situation that a line segment Se3 is present in the top-view window 1a and the operator is about to create a graphic element corresponding thereto in the front-view window 1b. The operator first moves the cross-hair cursor 3 to adjust its vertical line to the left end point P3, for example, of the line segment Se3. Keeping the vertical cursor line locked on that end point P3, the operator defines a point P4 in the front-view window 1b. Similarly, the operator defines another point P6 in the front-view window 1b, while keeping the vertical cursor line adjusted to the right end P5 of the line segment Se3, thereby drawing a line segment Se4 that connects between the newly-defined points P4 and P6. After that, another line segment Se5 having three-dimensional properties is generated from the coordinate values of the line segments Se3 and Se4 and displayed in the perspective-view window 1d. The three-dimensional line segment Se5 is further projected to the side-view plane. This projection results in a single point P7 appearing in the side-view window 1c as shown in the lower part of FIG. 7.

FIG. 8 shows a typical display screen when drawing a rectangle.

The upper part of FIG. 8 represents a specific situation that a line segment Se6 is ready in the top-view window 1a and the operator is about to create a rectangle corresponding thereto in the front-view window 1b. The operator first moves the cross-hair cursor 3 to adjust its vertical line to the left end point P8 of the line segment Se6. With the vertical cursor line kept on that end point P8, the operator defines a new point P9 in the front-view window 1b. Then the operator defines another point P11 in the front-view window 1b, while adjusting the vertical cursor line to the right end point P10 of the line segment Se6, thereby drawing a rectangle R1 having the points P9 and P11 on its diagonal. After that, a three-dimensional wire-frame model of the rectangle R1 is calculated from the coordinate values of the line segments Se6 in the top-view window 1a and the rectangle R1 in the front-view window 1b. The generated wire-frame model is displayed in the perspective-view window 1d and further projected onto the side view plane. This projection results in another line segment Se7 appearing in the side-view window 1c as shown in the lower part of FIG. 8.

FIG. 9 shows a typical display screen when drawing a rectangle associated with an existing circle.

As shown in the upper part of FIG. 9, a circle C has been drawn in the top-view window 1a and the operator is trying to create a rectangle in the front-view window 1b, with reference to the circle C. The operator first moves the cross-hair cursor 3 so that its vertical line will be tangential to the circle C. Keeping the vertical cursor line on that tangential point P12, the operator defines a new point P13 in the front-view window 1b. Then the operator defines another point P15 in the front-view window 1b, while keeping the vertical cursor line on the opposite tangential point P14, thereby drawing a rectangle R2 having the points P13 and P15 on its diagonal. After that, a three-dimensional wire-frame model of a cylinder is calculated from the coordinate values of the circle C in the top-view window 1a and the rectangle R2 in the front-view window 1b. The generated cylinder is displayed in the perspective-view window 1d and further projected to the side-view projection plane. The projection results in another rectangle R3 and it is displayed in the side-view window 1c as shown in the lower part of FIG. 9.

Figure 10:
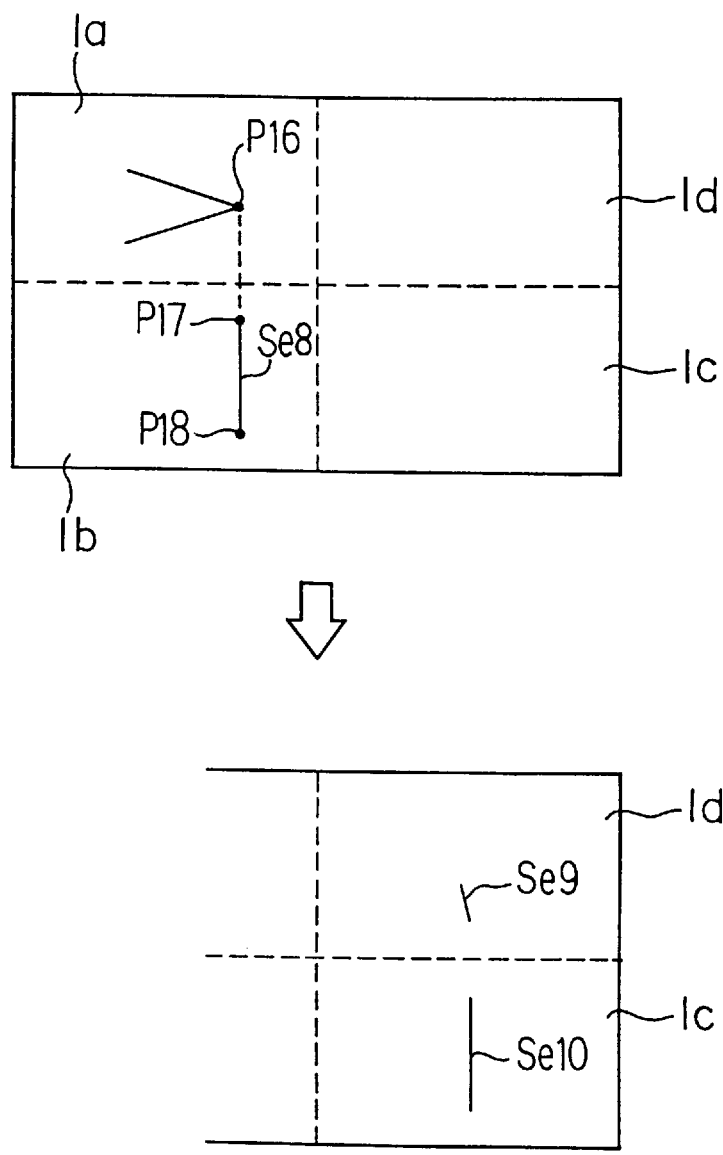
FIG. 10 is a diagram showing a typical display screen when drawing a line segment associated with an existing point.

FIG. 10 shows a typical display screen when drawing a line segment associated with an existing point.

It is assumed in the upper part of FIG. 10 that two lines intersect at a point P16 in the top-view window 1a and the operator is about to create a line segment corresponding thereto in the front-view window 1b. The operator first moves the cross-hair cursor 3 to adjust its vertical line to the point P16. With the vertical cursor line kept on the point P16, the operator defines a new point P17 and successively places another new point P18 in the front-view window 1b, thus drawing a line segment Se8 that connects the two points P17 and P18. Then, from the coordinate values of the point P16 in the top-view window 1a and the line segment Se8 in the front-view window 1b, a line segment Se9 is calculated as a three-dimensional model of the line segment Se8. The generated line segment Se9 is displayed in the perspective-view window 1d and further projected to the side view plane. This projection produces a line segment Se10 and it is displayed in the side-view window 1c as shown in the lower part of FIG. 10.

In the way described above, the CAD system creates and displays various graphic elements including points, line segments, circles, and arcs in the three view windows (i.e., top, front, and side views). Those graphic elements are stored in a memory of the CAD system as an set of structured variables. The following description will now present this structured data management for the graphic elements.

FIG. 11 shows typical data structure of the graphic elements.

The graphic elements can be classified by element types, i.e., "line segment," "circle," "arc," and so on. As shown in FIG. 11, data of each graphic element is handled as a combination of an element identifier (element ID) that identifies the graphic element and several variables that are defined depending on each element type. Take "line segment" for example. This element type is defined as a structured variable 4a shown in FIG. 11, which contains an element ID, length, X and Y coordinates of the start point, X and Y components of the pointing vector, and other attributes. Another structured variable 4b shows another element type "circle," which consists of an element ID, radius, X and Y coordinates of its center, and other attributes. Still another element type "arc" is defined by a structured variable 4c that consists of an element ID, radius, X and Y coordinates of its center, start angle, end angle, and other attributes. Those data are all controlled with common techniques such as indexed access or linked list search.

The CAD system makes access to those data when the operator edits or selects a graphic element presented on a graphic display screen. The operator normally picks up a graphic element by placing a mouse pointer at the vicinity of the element of interest and pressing a mouse button. This selective action invokes a searching operation inside the CAD system over the entire graphic element data stored in the memory, which directly compares each entry with the mouse position data, or screen coordinates of the mouse pointer sampled when the mouse button was pressed by the operator.

The operator issues commands to the CAD system mostly through the mouse cursor operations. Human interface is particularly important in the present invention, since it aims at the drafting of three-view drawings and at three-dimensional modeling. To provide the design engineers with a good feel in drafting operation, a friendly interface and appropriate feedback are essential. For example, a cross-hair cursor or equivalent function will allow operations analogous to a ruler used in traditional manual drawing work with a drafting board. With the cross-hair cursor on the display screen, the operator points to a specific graphic element to be selected or edited, thereby triggering an element search operation inside the CAD system. The system returns the search result by emphasizing (or highlighting) the pointed to graphic element, thus providing an appropriate feedback that helps the operator to recognize the element. Take the situation in FIG. 3, for example. The operator selects the line segment Se1 in the top-view window 1a to use as a reference for creating another graphic element in the front-view window 1b. With the highlighting technique, the CAD system distinguishably displays this line segment Se1 to notify the operator that the system has successfully searched for it and acknowledged it as the reference element for the process to follow.

Most mechanical drawings are drafted according to the third-quadrant three-view system, where a three-dimensional object is projected onto three orthogonal coordinate planes and the three projection views are arranged on a single drawing sheet. Based on a tacit understanding, the three-dimensional coordinate axes are not shown on the drawing sheet. As a matter of fact, the top view actually shows the result of orthographic projection onto the X-Y plane. Similarly, the front view shows the Y-Z plane, and the side view the Z-X plane. When creating a new graphic element in the front-view window with reference to an existing element in the top-view window, the new element will acquire Z-axis coordinate values, thus affecting its internal data structure. In the case of a line segment, for example, Z-axis values will be added to the start point and pointing vector definitions in the structured variable 4a in FIG. 11.

Figure 12:
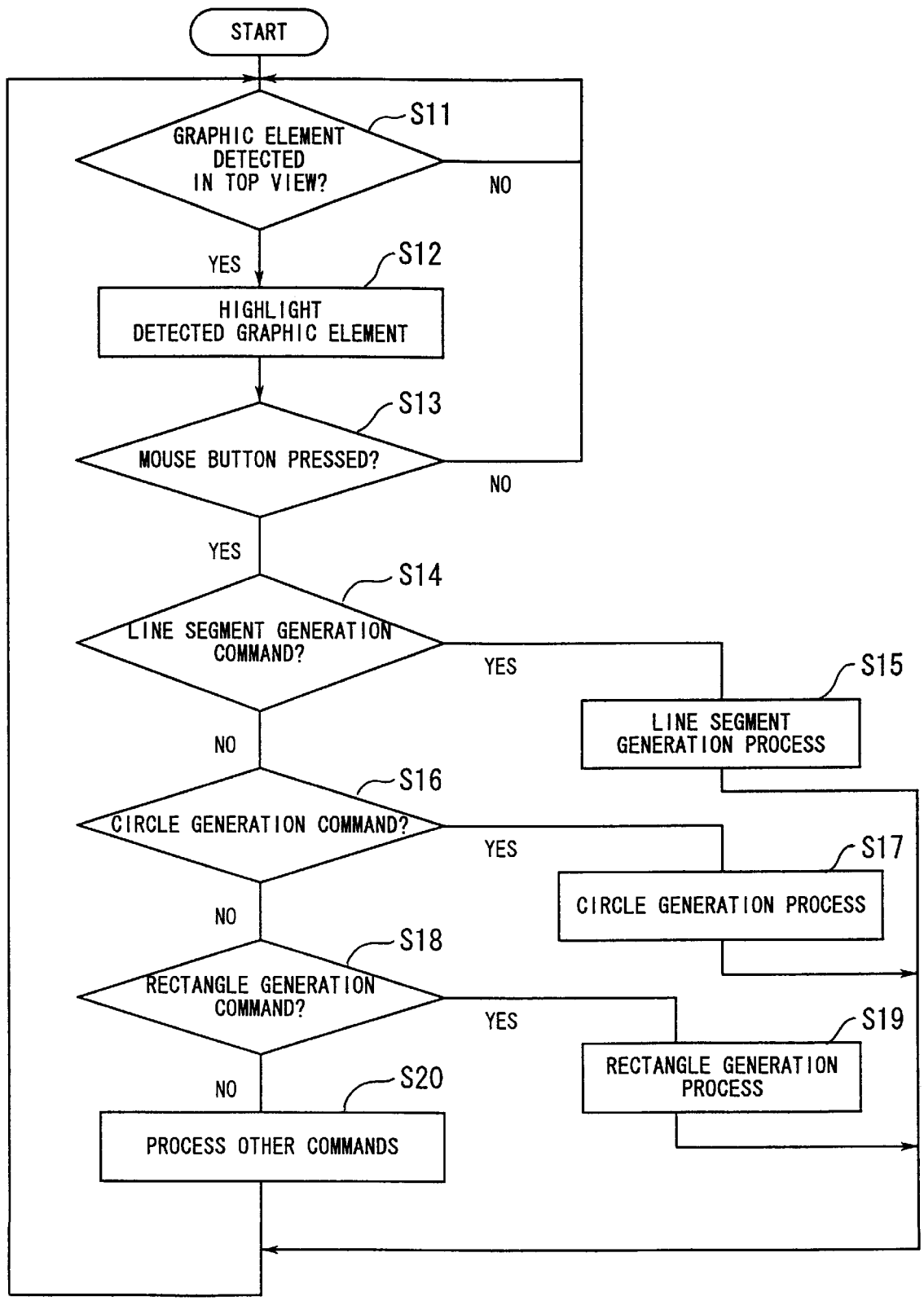
FIG. 12 is a flowchart showing a process of defining a graphic element.
Figure 13:
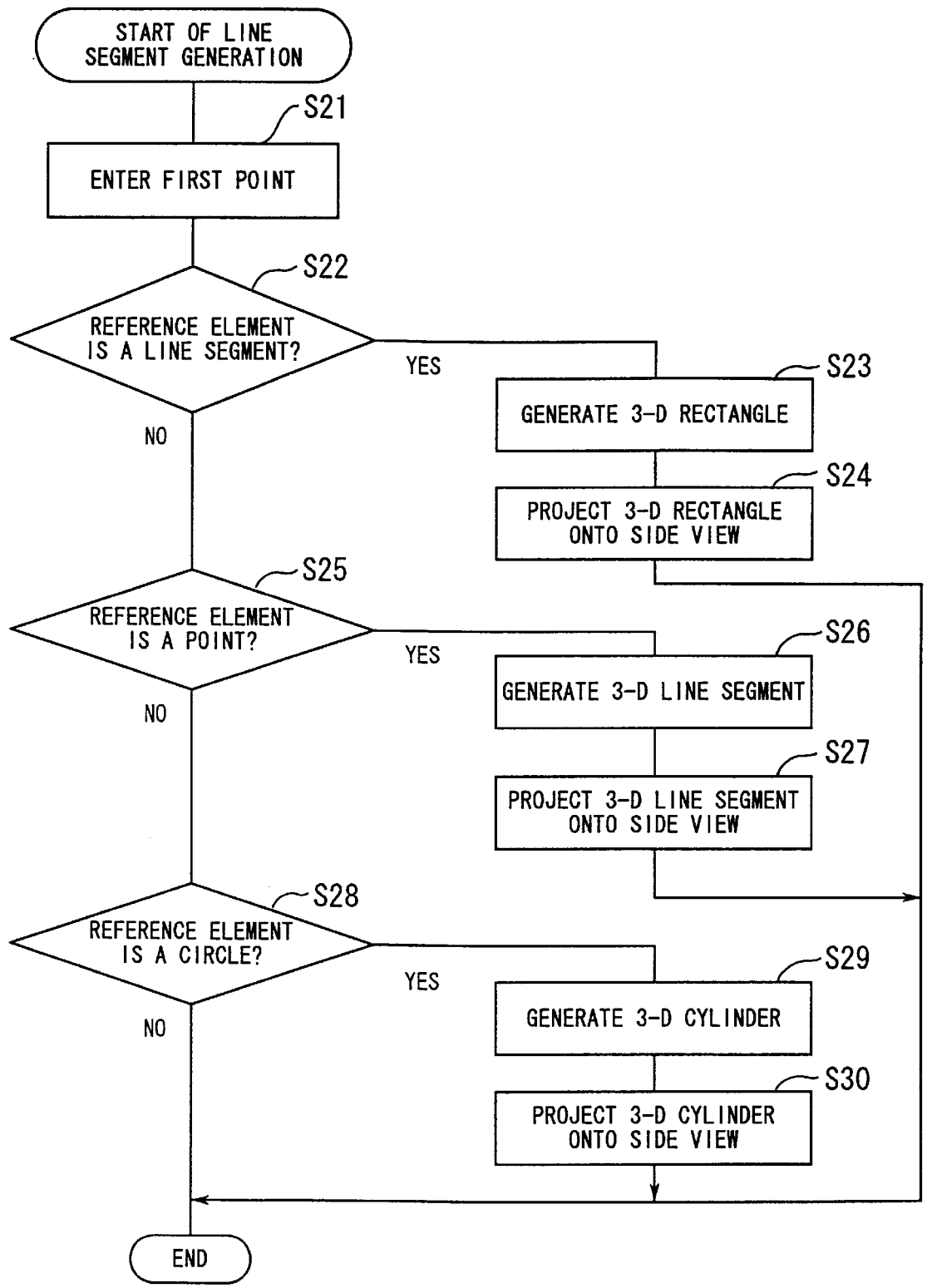
FIG. 13 is a flowchart showing a process of line segment generation.

With reference to FIGS. 12 and 13, the following description will be now devoted to a process to determine three-dimensional coordinates according to a command from the operator. For simplicity, it is assumed that graphic elements are available only in the top-view window and the cursor is positioned in the front-view window.

FIG. 12 is a flowchart showing a process of creating a new graphic element in the front-view window derived from an existing element in the top-view window. The process involves the following steps:

[S11] It is first tested whether a relevant graphic element exists in the top-view window or not. More specifically, the CAD system tries to find a graphic element lying on the vertical cursor line within the top-view window.

[S12] If any graphic element is found, the CAD system highlights it to notify the operator that the highlighted graphic element is a candidate for the reference element that will serve as a basis for the new graphic element to be created.

[S13] If the operator presses the mouse button, then the highlighted graphic element is selected as the reference element.

[S14] Once the reference element is determined, it is then necessary to know what kind of graphic element the operator is trying to define. This description assumes that the element type is given by the operator's prior choice of a CAD command. In step S14, it is tested whether a line segment generation command has been specified or not.

[S15] If the line segment generation command has been specified, the CAD system executes a line segment generation process.

[S16] If not, it is then tested whether a circle generation command has been specified or not.

[S17] If the circle generation command has been specified, the CAD system executes a circle generation process.

[S18] If not, it is then tested whether a rectangle generation command has been specified or not.

[S19] If the rectangle generation command has been specified, the CAD system executes a rectangle generation process.

[S20] If not, the CAD system will do more tests and processes for other commands such as for arc generation.

Next, FIG. 13 provides the details of the line segment generation process. The process involves the following steps:

[S21] The operator enters a first geometry point in the front-view window by pressing the mouse button while positioning the vertical cursor line at the highlighted graphic element in the top-view window.

[S22] Now it is necessary to examine the element type of the highlighted graphic element, or the reference element. In step S22, it is tested whether the reference element is a line segment or not.

[S23] If the reference element is a line segment, the CAD system generates a three-dimensional rectangle after acquiring a second geometry point that defines the other end point of the new line segment.

[S24] The generated three-dimensional rectangle is projected onto the side-view window.

[S25] If the reference element is not a line segment, it is then tested whether the reference element is a point or not.

[S26] If the reference element is a point, the CAD system generates a three-dimensional line segment after acquiring the second geometry point.

[S27] The generated three-dimensional line segment is projected onto the side-view window.

[S28] If the reference element is not a line segment or point, it is then tested whether the reference element is a circle or not.

[S29] If the reference element is a circle, the CAD system generates a three-dimensional cylinder after acquiring the second geometry point.

[S30] The generated three-dimensional cylinder is projected onto the side-view window.

The CAD system does have more detailed steps also for the circle generation and rectangle generation processes as mentioned in steps S17 and S19 in FIG. 12. However, since they are analogous to the line segment generation process just shown in FIG. 13, the present description omits their explanation.

Figure 14:
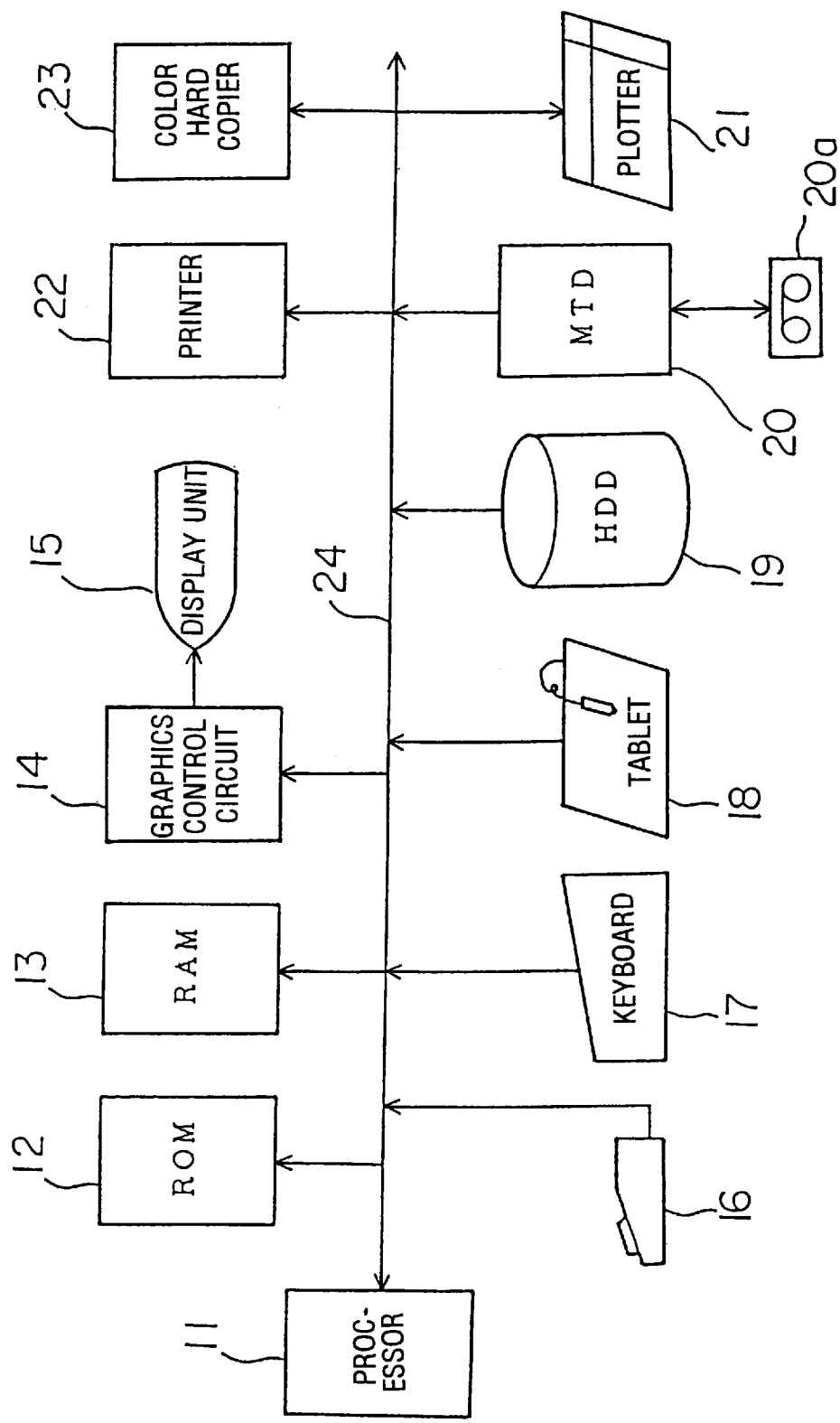
FIG. 14 is a diagram showing hardware structure of a workstation in which the present invention is implemented.

FIG. 14 illustrates the hardware structure of a workstation in which the present invention is implemented.

The workstation is constructed with the following components: a processor 11, a read-only memory (ROM) 12, a main memory (RAM) 13, a graphics control circuit 14, a display unit 15, a mouse 16, a keyboard 17, a tablet 18, a hard disk drive (HDD) 19, a magnetic tape drive (MTD) 20, a plotter 21, a printer 22, and a color hard copier 23. Those components are interconnected via their respective interface controllers (not shown) and a system bus 24.

The processor 11 totally supervises the workstation. The read only memory 12 contains programs necessary for power-up procedure. Besides being loaded with system programs and three-dimensional CAD application software, the main memory 13 is used to generate and store data for drawings, projection views, and graphic elements under edit operation.

The graphics control circuit 14, employing frame memories and their peripherals, outputs a video signal to the display unit 15 by converting from various data created in the main memory 13. Such display data may include two-dimensional line segments, circles, arcs, ellipses, spline curves, and projection views. Upon reception of the video signal, the display unit 15 displays a drawing consisting of graphic elements.

The mouse 16 is a pointing device to control movement of the cross-hair cursor on the screen. It is used for specifying an input position when defining a new graphic element, and also used for selecting an on-screen graphic element by positioning the cursor thereon and clicking the button. The keyboard 17 is used to enter some numerical parameters for specifying the view direction of the three-dimensional wire-frame model. It is also used for entering names of three-view data files.

The hard disk drive 19 stores system programs and three-dimensional CAD applications including programs for line segment generation, circle generation, and rectangle generation. It also stores a variety of graphic elements used for drafting. The magnetic tape drive 20 is an external storage device for downloading design data files from a magnetic tape 20a and, in turn, saving the created design data.

A printed copy of the created design data can be obtained via the plotter 21, the printer 22, and/or the color hard copier 23.

The above discussion will be summarized as follows. According to the present invention, a graphic element is first drawn in one of the three view windows and another graphic element, is then drawn in another view window with reference to the former graphic element. By using the geometry data available in the two windows, further elements will be generated in the remaining windows. According to this method, since the operator only has to enter data into two windows, he/she can use drafting techniques similar to those for two-dimensional CAD systems.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of drawing a three-dimensional object in a drawing system that shows a top view, a front view, and a side view using first, second, and third view windows, the method comprising the steps of:

drawing a figure containing a first graphic element on the first view window;

defining a first geometry point in the second view window adjacent to the first view window by using a cross-hair cursor extending across the first and second view windows so that the first geometry point will have a geometrical relationship with the first graphic element drawn in the first view window;

defining a second geometry point in the second view window by using the cross-hair cursor so that the second geometry point will have a geometrical relationship with the first graphic element, and further defining a second graphic element with the first and second geometry points so as to give a depth to the figure drawn in the first view window; and generating a third graphic element having a shape based on shapes of the first and second graphic elements and displaying the third graphic element in the third view window.

2. A method according to claim 1, further comprising the step of generating a three-dimensional figure based on the first and second graphic elements, and displaying a perspective view of the three-dimensional figure in a remaining area of the three-view display screen.

3. A method according to claim 2, wherein the step of generating the third graphic element includes projecting the three-dimensional figure onto the third view window.

4. A method according to claim 1, wherein, the first graphic element is a line segment;

the step of defining the first geometry point defines the first geometry point while keeping the cross-hair cursor adjusted onto the line segment;

the step of defining the second geometry point defines the second geometry point while keeping the cross-hair cursor adjusted onto the line segment;

the second graphic element is another line segment that connects between the first and second geometry points; and the third graphic element is a rectangle.

5. A method according to claim 1, wherein:

the first graphic element is a line segment;

the step of defining the first geometry point defines the first geometry point while keeping the cross-hair cursor adjusted to an end of the line segment;

the step of defining the second geometry point defines the second geometry point while keeping the cross-hair cursor adjusted to the other end of the line segment;

the second graphic element is another line segment that connects between the first and second geometry points; and the third graphic element is a single point.

6. A method according to claim 1, wherein:

the first graphic element is a line segment;

the step of defining the first geometry point defines the first geometry point while keeping the cross-hair cursor adjusted to an end of the line segment;

the step of defining the second geometry point defines the second geometry point while keeping the cross-hair cursor adjusted to the other end of the line segment;

the second graphic element is a rectangle that includes the first and second geometry points as two diagonal vertexes; and the third graphic element is another line segment.

7. A method according to claim 1, wherein:

the first graphic element is a point;

the step of defining the first geometry point defines the first geometry point while keeping the cross-hair cursor adjusted to the point;

the step of defining the second geometry point defines the second geometry point while keeping the cross-hair cursor adjusted to the point;

the second graphic element is a line segment that connects between said first and second geometry points; and the third graphic element is another line segment.

8. A method according to claim 1, wherein:

the first graphic element is a circle;

the step of defining the first geometry point defines the first geometry point while keeping the cross-hair cursor tangential to the circle at a first tangential point;

the step of defining the second geometry point defines the second geometry point while keeping the cross-hair cursor tangential to the circle at a second tangential point;

the second graphic element is a rectangle that includes the first and second geometry points as two diagonal vertexes; and the third graphic element is another rectangle.

9. A method of drawing a three-dimensional object in a drawing system, the method comprising the steps of:

positioning a cross-hair cursor at a selected position relative to a graphic element displayed in a first view window, the cross-hair cursor extending across the first view window and a second view window adjacent to the first view window; and defining a point in the second view window, the point having a geometrical relationship with the graphic element, the geometrical relationship being based on a position indicated by the cross-hair cursor.

10. The method of claim 9, further comprising the steps of:

positioning the cross-hair cursor at an additional selected position relative to the graphic element; and defining an additional point in the second view window, the additional point having a geometric relationship with the graphic element, the geometric graphic relationship of the additional geometry point being based on an additional position indicated by the cross-hair cursor.

11. The method of claim 10, further comprising the step of defining an additional geometric element based on the point and the additional point.

12. The method of claim 11, further comprising the step of generating a third graphic element based on the graphic element and the additional graphic element and displaying the third graphic element in a third view window.

13. A computer-readable medium encoded with a program for drawing a three-dimensional object on a display screen, said program comprising the functions of:

displaying a figure containing a first graphic element in a first view window;

defining a first point in a second view window adjacent to the first view window based on a first position of a cross-hair cursor extending across the first and second view windows so that the first point has a geometrical relationship with the first graphic element drawn in the first view window;

defining a second point in the second view window based on a second position of the cross-hair cursor so that the second point has a geometrical relationship with the first graphic element, and further defining a second graphic element with the first and second points so as to give a depth to the figure drawn in the first view window; and generating a third graphic element having a shape based on shapes of the first and second graphic elements and displaying the third graphic element in the third view window.

14. A computer-readable medium encoded with a program for drawing a three-dimensional object on a three-view display screen, said program comprising the functions of:

detecting a selected position of a cross-hair cursor relative to a graphic element displayed in a first view window, the cross-hair cursor extending across the first view window and a second view window adjacent to the first view window; and defining in the second view window a geometry point having a geometrical relationship with the graphic element, the geometrical relationship being based on a position indicated by the cross-hair cursor.

* * * * *